(12) United States Patent
Kawai et al.

(10) Patent No.: US 9,828,029 B2
(45) Date of Patent: Nov. 28, 2017

(54) SUB-FRAME FOR VEHICLE

(71) Applicants: F-TECH INC., Kuki, Saitama (JP); HONDA MOTOR CO., LTD., Tokyo (JP)

(72) Inventors: Toru Kawai, Tochigi (JP); Tomoyuki Yokota, Tochigi (JP); Toshiya Takahashi, Wako (JP); Kazumi Mikami, Wako (JP)

(73) Assignees: F-TECH INC., Kuki (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/111,983

(22) PCT Filed: Jan. 27, 2015

(86) PCT No.: PCT/JP2015/052187
§ 371 (c)(1),
(2) Date: Jul. 15, 2016

(87) PCT Pub. No.: WO2015/111754
PCT Pub. Date: Jul. 30, 2015

(65) Prior Publication Data
US 2016/0347368 A1    Dec. 1, 2016

(30) Foreign Application Priority Data
Jan. 27, 2014   (JP) .................................. 2014-012269

(51) Int. Cl.
*B62D 21/11*    (2006.01)
(52) U.S. Cl.
CPC .................................... *B62D 21/11* (2013.01)
(58) Field of Classification Search
CPC .................................................... B62D 21/11
See application file for complete search history.

(56) References Cited

U.S. PATENT DOCUMENTS

| | | | |
|---|---|---|---|
| 5,611,569 A | 3/1997 | Sekiguchi et al. | |
| 8,857,835 B2* | 10/2014 | Lee .................. | B60G 21/051 280/124.106 |

(Continued)

FOREIGN PATENT DOCUMENTS

| | | |
|---|---|---|
| DE | 19536460 B4 | 3/2011 |
| JP | 2721312 B2 | 3/1998 |

(Continued)

OTHER PUBLICATIONS

International Search Report dated Apr. 7, 2015, issued in counterpart international application No. PCT/JP2015/052187(2pages).

*Primary Examiner* — James A English
(74) *Attorney, Agent, or Firm* — Westerman, Hattori, Daniels & Adrian, LLP

(57) ABSTRACT

A pair of side members extends in a longitudinal direction of a vehicle in a width direction and have a plurality of coupling portions coupling with a vehicle body member of a vehicle. A pair of cross members extends in the width direction to face each other in the longitudinal direction and couple the pair of side members. A pair of coupling members is provided in the side members to couple a corresponding one of the plurality of coupling portions with the vehicle body member. A pair of support members is provided in the cross members to support correspondingly a pair of suspension arms provided in the vehicle and facing each other in the width direction. The lower parts of the support members are welded to upper walls of the coupling members and vertical walls of one of the cross members straddling the upper walls and the vertical walls.

8 Claims, 4 Drawing Sheets

(56) References Cited

U.S. PATENT DOCUMENTS

| | | | | |
|---|---|---|---|---|
| 8,998,305 | B2* | 4/2015 | Obata | B62D 21/11 |
| | | | | 296/193.08 |
| 2009/0243271 | A1* | 10/2009 | Tanaka | B60G 3/20 |
| | | | | 280/781 |
| 2009/0243272 | A1* | 10/2009 | Tanaka | B60G 3/202 |
| | | | | 280/794 |
| 2013/0008735 | A1 | 1/2013 | Hiramatsu et al. | |
| 2014/0300137 | A1* | 10/2014 | Komiya | B62D 21/11 |
| | | | | 296/187.11 |
| 2015/0158530 | A1* | 6/2015 | Mikami | B62D 21/11 |
| | | | | 280/782 |
| 2016/0236718 | A1* | 8/2016 | Tatsuwaki | B62D 21/155 |

FOREIGN PATENT DOCUMENTS

| | | | |
|---|---|---|---|
| JP | 2001-39333 A | 2/2001 | |
| JP | 2010-30531 A | 2/2010 | |
| JP | 2011-207343 A | 10/2011 | |
| JP | WO 2013187112 A1 * | 12/2013 | ............. B62D 21/11 |

* cited by examiner

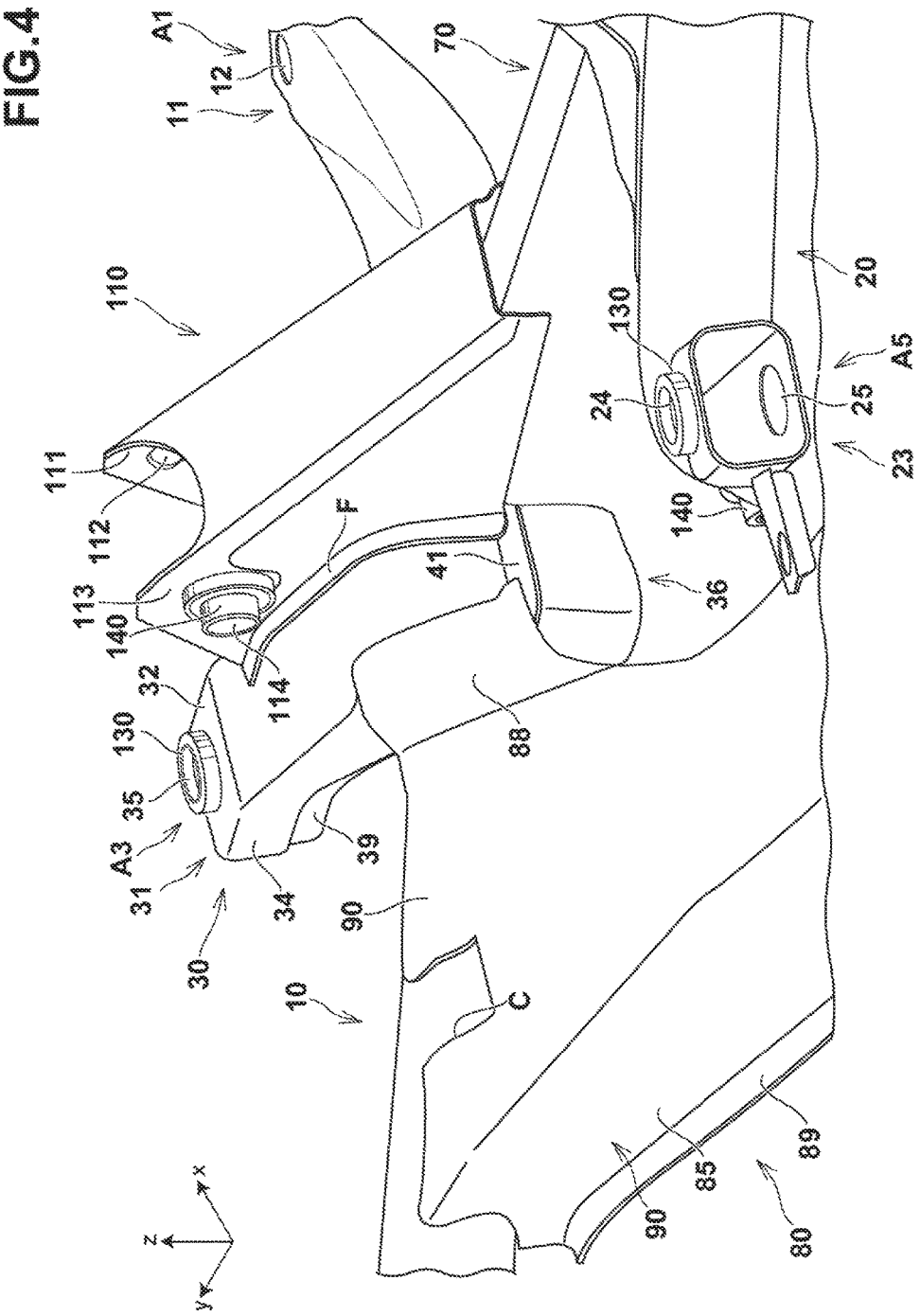

SUB-FRAME FOR VEHICLE

TECHNICAL FIELD

The present invention relates to a vehicle subframe, and more particularly relates to a vehicle subframe that supports a suspension arm and the like and is mounted on a vehicle body of a vehicle such as an automobile.

BACKGROUND ART

In recent years, a vehicle subframe of an automobile or the like receives large input loads such as tension and compression from each arm generated particularly at the time of turning, due to improvement of turning performance of the vehicle or the like.

Therefore, with respect to such a subframe, it has been required to increase the strength and stiffness thereof, while improving productivity thereof and the like.

Under such circumstances, Patent Document 1 relates to a suspension subframe, and discloses a configuration in which upper and lower support portions are integrally formed on a member in a vehicle width direction in order to suppress a decrease in reliability with respect to the strength, resulting from a distortion and stress concentration occurring in a welded part, and thereby improving the reliability with respect to the strength, while achieving light weight and high stiffness.

PRIOR ART DOCUMENT

Patent Document

Patent Document 1: Japanese Patent Application Laid-open Publication No. 2010-30531

SUMMARY OF THE INVENTION

Problem to be Solved by the Invention

However, according to studies made by the present inventors, in Patent Document 1, because the upper and lower support portions are integrally formed on the member in the vehicle width direction, it may be difficult to integrally form the support portions depending on an attaching position thereof to different vehicle body members and the number thereof according to a vehicle type and specification thereof. Accordingly, there is still a room for improvement regarding the issue of configuring the support portions of the suspension arm without being affected by the attaching position thereof to the vehicle body members and the number thereof.

According to the studies made by the present inventors, energy saving performance has been strongly desired with respect to a vehicle such as an automobile, at the time of production thereof. In this respect, also in a vehicle subframe, a new configuration that can simplify the configuration while ensuring required productivity, strength, and the like has been strongly desired.

The present invention has been achieved in view of the above problems, and an object of the present invention is to provide a vehicle subframe that can configure a support portion of a suspension arm with a simple configuration, while ensuring required productivity according to various types of vehicles, and improve support stiffness of the suspension arm.

Means for Solving the Problem

In order to achieve the above object, a vehicle subframe according to a first aspect of the present invention comprises a pair of side members respectively extending in a longitudinal direction of a vehicle, while facing each other in a width direction of the vehicle, and respectively having a plurality of coupling portions provided for coupling with a vehicle body member of the vehicle, a pair of coupling members respectively provided in each of the pair of side members to couple a corresponding one of the plurality of coupling portions with the vehicle body member, a pair of cross members respectively extending in the width direction, while facing each other in the longitudinal direction, to couple the pair of side members with each other respectively, and a pair of support members respectively provided in one of the pair of cross members, to support correspondingly a pair of suspension arms provided in the vehicle, facing each other in the width direction, wherein a lower part of the pair of support members is welded respectively to upper walls of the pair of coupling members and vertical walls of the one of the cross members, straddling the upper walls and the vertical wall. In each of the pair of side members, the coupling portions respectively include a front coupling portion provided on a front side of the vehicle, a rear coupling portion provided on a rear side of the vehicle with respect to the front coupling portion, and an intermediate coupling portion provided between the front coupling portion and the rear coupling portion in the longitudinal direction, and each of the pair of coupling members is provided correspondingly to the intermediate coupling portion. Each of the pair of coupling members has an upper member open downward of the vehicle and a lower member open upward of the vehicle, and the upper member and the lower member corresponding thereto sandwich a corresponding one of the pair of side members and are welded thereto. Also, a gap portion is provided inside thereof in the width direction, between the upper wall of the upper member of a corresponding one of the pair of coupling members and a bottom wall of the lower member of the corresponding one of the pair of coupling members.

According to a second aspect of the present invention, in addition to the first aspect, a through-hole is provided in the bottom wall of each of the lower members of the pair of coupling members.

According to a third aspect of the present invention, in addition to the first or second aspect, each of the upper members of the pair of coupling members is respectively welded to the other one of the pair of cross members, and in each of the pair of coupling members, a welded portion between the upper member and the pair of support members and a welded portion between the upper member and the other cross member are arranged away from each other in the longitudinal direction.

According to a fourth aspect of the present invention, in addition to the third aspect, the other cross member includes a central portion in the width direction, a pair of end portions having a larger width in the longitudinal direction than a width of the central portion in the longitudinal direction, and a pair of connection portions that connect the central portion and the pair of end portions respectively correspondingly, and in each of the pair of side members, each of the upper members of the pair of coupling members is welded correspondingly to the pair of end portions of the other cross member.

According to a fifth aspect of the present invention, in addition to any of the first to fourth aspect, the pair of side members is formed of a tubular member, respectively, in each of the pair of side members, the front coupling portion of the plurality of coupling portions respectively has a crushed portion in which the tubular member is crushed in a vertical direction of the vehicle, and the crushed portion respectively has a mounting surface with respect to the vehicle body member.

According to a vehicle subframe according to a sixth aspect of the present invention comprises a pair of side members respectively extending in a longitudinal direction of a vehicle, while facing each other in a width direction of the vehicle, and respectively having a plurality of coupling portions provided for coupling with a vehicle body member of the vehicle, a pair of coupling members respectively provided in each of the pair of side members to couple a corresponding one of the plurality of coupling portions with the vehicle body member, a pair of cross members respectively extending in the width direction, while facing each other in the longitudinal direction, to couple the pair of side members with each other respectively, and a pair of support members respectively provided in one of the pair of cross members, to support correspondingly a pair of suspension arms provided in the vehicle, facing each other in the width direction, wherein a lower part of the pair of support members is welded respectively to upper walls of the pair of coupling members and vertical walls of the one of the cross members, straddling the upper walls and the vertical wall. In each of the pair of side members, the coupling portions respectively include a front coupling portion provided on a front side of the vehicle, a rear coupling portion provided on a rear side of the vehicle with respect to the front coupling portion, and an intermediate coupling portion provided between the front coupling portion and the rear coupling portion in the longitudinal direction, and each of the pair of coupling members is provided correspondingly to the intermediate coupling portion. Each of the pair of coupling members has an upper member open downward of the vehicle and a lower member open upward of the vehicle, and the upper member and the lower member corresponding thereto sandwich a corresponding one of the pair of side members and are welded thereto. Also, each of the upper members of the pair of coupling members is respectively welded to the other one of the pair of cross members, and in each of the pair of coupling members, a welded portion between the upper member and the pair of support members and a welded portion between the upper member and the other cross member are arranged away from each other in the longitudinal direction.

According to a seventh aspect of the present invention, in addition to the sixth aspect, the other cross member includes a central portion in the width direction, a pair of end portions having a larger width in the longitudinal direction than a width of the central portion in the longitudinal direction, and a pair of connection portions that connect the central portion and the pair of end portions respectively correspondingly, and in each of the pair of side members, each of the upper members of the pair of coupling members is welded correspondingly to the pair of end portions of the other cross member.

According to an eighth aspect of the present invention, in addition to the sixth or seventh aspect, the pair of side members is formed of a tubular member, respectively, in each of the pair of side members, the front coupling portion of the plurality of coupling portions respectively has a crushed portion in which the tubular member is crushed in a vertical direction of the vehicle, and the crushed portion respectively has a mounting surface with respect to the vehicle body member.

Effect of the Invention

According to the configuration of the first aspect of the present invention, the vehicle subframe includes the pair of side members respectively extending in the longitudinal direction of a vehicle, while facing each other in the width direction of the vehicle, and respectively having a plurality of coupling portions provided for coupling with the vehicle body member of the vehicle, the pair of coupling members respectively provided in each of the pair of side members to couple the corresponding one of the plurality of coupling portions with the vehicle body member, the pair of cross members respectively extending in the width direction, while facing each other in the longitudinal direction, to couple the pair of side members with each other respectively, and the pair of support members respectively provided in one of the cross members, to support correspondingly the pair of suspension arms provided in the vehicle, while facing each other in the width direction. The lower parts of the support members are welded respectively to the upper walls of the coupling members and the vertical walls of one of the cross members, straddling the upper walls and vertical walls. Accordingly, the vehicle subframe that can configure the support portions of the suspension arms with a simple configuration, while ensuring required productivity according to various types of vehicles, and can improve support stiffness of the suspension arms can be realized.

According to the configuration of the first aspect of the present invention, in addition, each of the pair of the coupling members is provided corresponding to the intermediate coupling portion provided between the front coupling portion and the rear coupling portion in the longitudinal direction. Accordingly, mounting stiffness of the vehicle subframe to the vehicle can be further enhanced.

According to the configuration of the first aspect of the present invention, in addition, each of the pair of the coupling members has the upper member open downward of the vehicle and the lower member open upward of the vehicle, and the upper member and the lower member corresponding thereto sandwich a corresponding one of the pair of the side members and are welded thereto. Accordingly, welding strength between each of the pair of the coupling members and the corresponding one of the pair of the side members can be improved with a simple configuration.

According to the configuration of the first aspect of the present invention, in addition, the gap portion is provided inside the width direction of the vehicle, between the upper wall of the upper member of the corresponding one of the pair of the coupling members and the bottom wall of the lower member of the corresponding one of the pair of the coupling members. Accordingly, the productivity of the vehicle subframe can be improved with a simple configuration, while achieving weight saving of the vehicle subframe and improving the throwing power of the paint.

According to the configuration of the second aspect of the present invention, because the through-hole is provided in the bottom wall of each of the lower members of the pair of coupling members, discharge of water, foreign matter, and the like from the inside of the vehicle subframe can be performed simply and reliably.

According to the configuration of the third or sixth aspect of the present invention, each of the upper members of the pair of the coupling members is respectively welded to the pair of the other cross members, and in each of the pair of the coupling members, the welded portion between the upper member and the pair of support members and the welded portion between the upper member and the other cross member are arranged away from each other in the longitudinal direction. Accordingly, the production process of the vehicle subframe can be simplified, while enhancing the strength thereof and the like.

According to the configuration of the fourth or seventh aspect of the present invention, the other cross member has the central portion in the width direction, the pair of end portions having a larger width in the longitudinal direction than the width of the central portion in the longitudinal direction, and the pair of connection portions that connect the central portion and the pair of end portions respectively correspondingly. In each of the pair of the side members, each of the upper members of the pair of the coupling members is welded correspondingly to the pair of end portions of the other cross member. Accordingly, the strength of the vehicle subframe can be further enhanced, while suppressing an unnecessary increase in weight of the vehicle subframe.

According to the configuration of the fifth or eighth aspect of the present invention, in the pair of side members respectively formed of a tubular member, the front coupling portion of the plurality of coupling portions respectively has a crushed portion in which the tubular member is crushed in the vertical direction of the vehicle, and the crushed portion respectively has a mounting surface with respect to the vehicle body member. Accordingly, the mounting reliability to the vehicle body can be improved with a simple configuration.

BRIEF DESCRIPTION OF THE DRAWINGS

FIG. 4 is a partially enlarged perspective view of the vehicle subframe according to the embodiment.

EMBODIMENT FOR CARRYING OUT THE INVENTION

Figure 1:
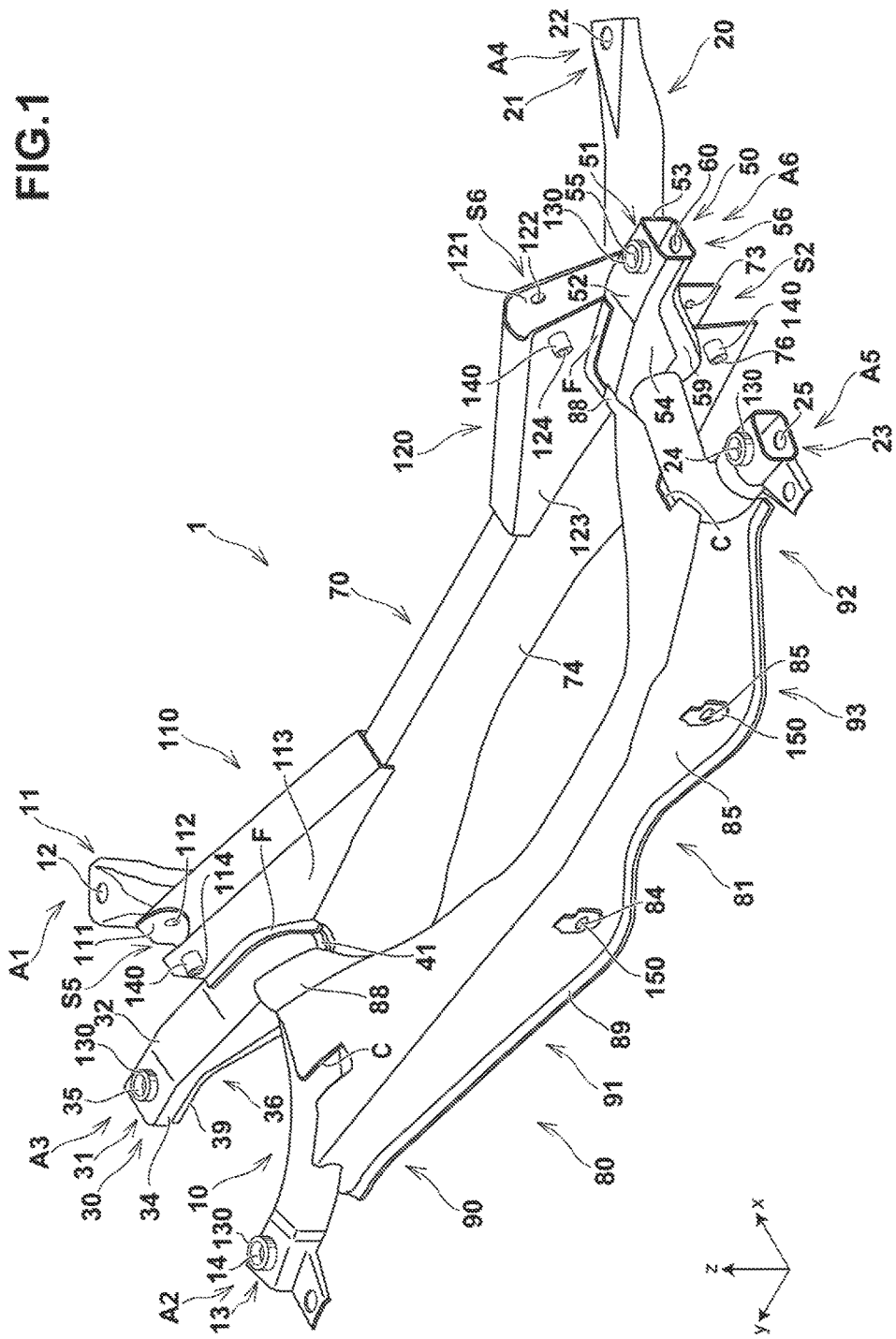
FIG. 1 is a perspective view of a vehicle subframe according to an embodiment of the present invention.

Embodiments of a vehicle subframe according to the present invention will be explained below in detail with reference to the accompanying drawings. In the drawings, an x-axis, a y-axis, and a z-axis form a three-dimensional orthogonal coordinate system. A positive direction of the x-axis is a forward direction of a vehicle body, a positive direction of the y-axis is a left direction of the vehicle body, and a positive direction of the z-axis is an upper direction of the vehicle body. The x-axis direction may be referred to as "longitudinal direction", and the y-axis direction may be referred to as "width direction".

Figure 2:
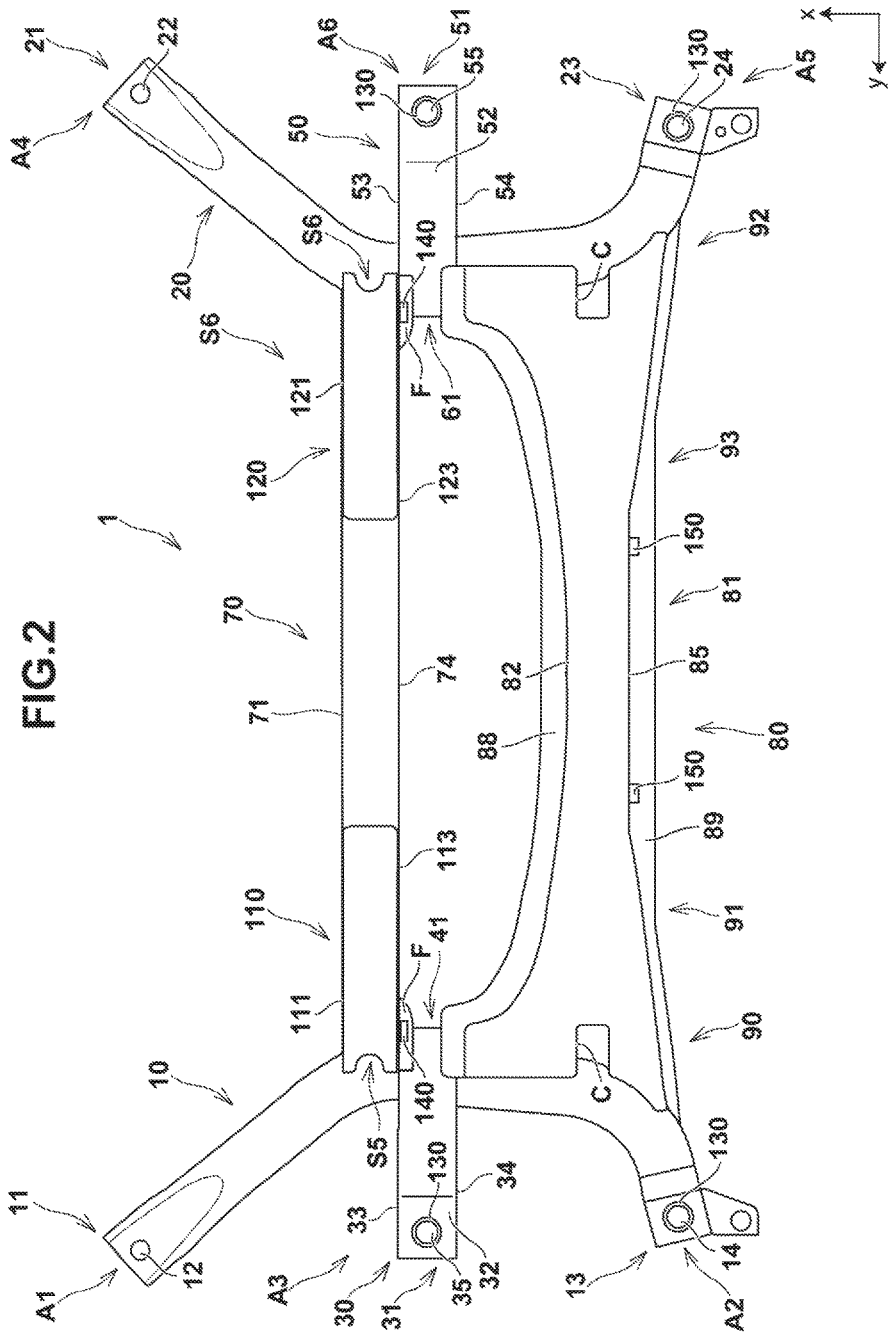
FIG. 2 is a plan view of the vehicle subframe according to the embodiment.
Figure 3:
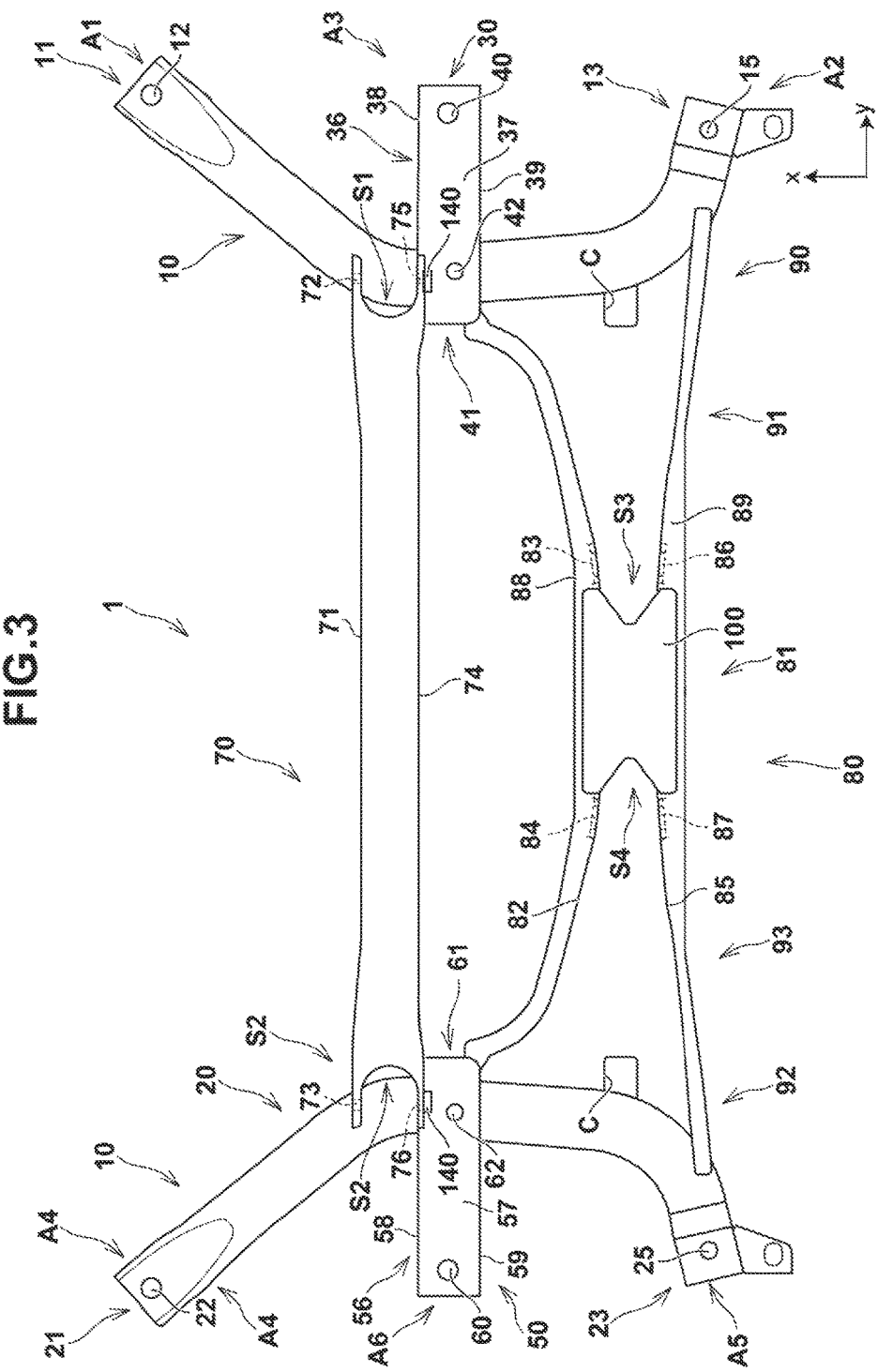
FIG. 3 is a bottom view of the vehicle subframe according to the embodiment.

FIG. 1 is a perspective view of a vehicle subframe according to an embodiment of the present invention, FIG. 2 is a plan view of the vehicle subframe according to the present embodiment, and FIG. 3 is a bottom view of the vehicle subframe according to the present embodiment. FIG. 4 is a partially enlarged perspective view of the vehicle subframe according to the present embodiment.

As shown in FIGS. 1 to 4, a subframe 1 is mounted on a vehicle body such as a rear side frame of a vehicle such as an automobile, to support a suspension arm (all not shown). Typically, the subframe 1 basically has a bilaterally symmetrical shape with respect to a plane parallel to an x-z plane and passing the center in a width direction of the vehicle body.

Specifically, the subframe 1 has a parallel cross shape in a plan view, and includes a left side member 10, a right side member 20, a front cross member 70, and a rear cross member 80, which are correspondingly welded typically by arc welding or the like and integrated with each other. The left side member 10 and the right side member 20 are respectively obtained typically by forming one pipe material such as a steel pipe, and respectively extend in a longitudinal direction, facing each other with a gap therebetween in the width direction. The front cross member 70 and the rear cross member 80 are respectively obtained typically by press-forming one flat plate member such as a steel plate, and respectively extend in the width direction, facing each other with a gap therebetween in the longitudinal direction.

The left side member 10, the right side member 20, the front cross member 70, and the rear cross member 80, and the configuration relating thereto are described in detail sequentially from the left side member 10.

<Configuration of Left Side Member>

The left side member 10 typically has a curved shape protruded rightward in a plan view, and includes a left crushed portion 11 extending toward left front from a front part of an intermediate portion of the left side member 10 in a longitudinal direction, and formed so that an upper surface and a lower surface thereof form a planar shape at a front end thereof. The left side member 10 also includes a left rectangular formed portion 13 extending toward left rear from a rear part of the intermediate portion and formed to have a vertical sectional shape in a substantially rectangular shape at a rear end thereof.

The left crushed portion 11 has a mounting hole 12 formed by punching so as to penetrate the left crushed portion 11 in a vertical direction. The left rectangular formed portion 13 has a left rear through-hole 14 formed by punching so as to penetrate an upper wall of the left rectangular formed portion 13 in the vertical direction, a left rear through-hole 15 formed by punching so as to penetrate a lower wall thereof in the vertical direction and facing the left rear through-hole 14 below thereof, and a collar member 130 arranged with respect to the left rear through-hole 14. The collar member 130 can be fitted between the left rear through-hole 14 and the left rear through-hole 15. A steel plate member or the like having a substantially U-shape in a vertical section can be used as the left side member 10.

<Configuration of Right Side Member>

The right side member 20 typically has a curved shape protruded leftward in a plan view, and includes a right crushed portion 21 extending toward right front from a front part of an intermediate portion of the right side member 20 in the longitudinal direction, and formed so that an upper surface and a lower surface thereof form a planar shape at a front end thereof. The right side member 20 also includes a right rectangular formed portion 23 extending toward right rear from a rear part of the intermediate portion and formed to have a vertical sectional shape in a substantially rectangular shape at a rear end thereof.

The right crushed portion 21 has a mounting hole 22 formed by punching so as to penetrate the right crushed portion 21 in the vertical direction. The right rectangular formed portion 23 has a right rear through-hole 24 formed by punching so as to penetrate an upper wall of the right rectangular formed portion 23 in the vertical direction, a right rear through-hole 25 formed by punching so as to penetrate a lower wall thereof in the vertical direction and facing the right rear through-hole 24 below thereof, and a collar member 130 arranged with respect to the right rear through-hole 24. The collar member 130 can be fitted between the right rear through-hole 24 and the right rear through-hole 25. A steel plate member or the like having a substantially U-shape in a vertical section can be used as the right side member 20.

<Configuration of Left Coupling Member>

The left side member 10 is provided with a left coupling member 30 having a box-shaped closed section, which is obtained typically by press-forming a flat plate member such as a steel plate. In terms of increasing mounting stiffness to the vehicle body such as the rear side frame, it is preferable to provide the left coupling member 30 in the intermediate portion of the left side member 10 in the longitudinal direction.

The left coupling member 30 is configured by an upper member 31 welded, typically by arc welding or the like, to an upper outer periphery of the intermediate portion of the left side member 10 to form a vertical sectional shape, typically, in a substantially U-shape open downward, and a lower member 36 welded, typically by arc welding or the like, to a lower outer periphery of the intermediate portion of the left side member 10 to form a vertical sectional shape, typically, in a substantially U-shape open upward, facing the upper member 31 below thereof. The above configuration is preferable in terms of enabling that the outer periphery of the intermediate portion of the left side member 10 is enclosed and sandwiched vertically by the upper member 31 and the lower member 36 and is welded thereto with a long weld length, to enhance the weld strength thereof.

The upper member 31 has a pair of flanges 33 and 34 suspended downward from opposite ends of an upper wall 32 of the upper member 31 in the longitudinal direction. The lower member 36 has a pair of flanges 38 and 39 extending upward from opposite ends in the longitudinal direction of a bottom wall 37 of the lower member 36. The pair of flanges 33 and 34 of the upper member 31 and the pair of flanges 38 and 39 of the lower member 36 are correspondingly welded to each other typically by arc welding or the like, and the upper member 31 and the lower member 36 cooperate to form a box-shaped closed section.

The upper member 31 has a left through-hole 35 formed by punching so as to penetrate the left end of the upper wall 32 in the vertical direction, and a collar member 130 is arranged and fixed to the left through-hole 35. The lower member 36 has a left through-hole 40 formed by punching so as to penetrate the bottom wall 37 in the vertical direction, and facing the left through-hole 35 below thereof. The collar member 130 can be fitted between the left through-holes 35 and 40.

A right side of the upper wall 32 of the upper member 31 and a right side of the bottom wall 37 of the lower member 36 are away from each other with a predetermined gap in the vertical direction to define a gap 41, which is away from the upper wall 32 of the upper member 31, the bottom wall 37 of the lower member 36, and the intermediate portion of the left side member 10. A through-hole 42 is provided at a bottommost part of the bottom wall 37 of the lower member 36.

The specific configuration of the gap 41 away from the upper wall 32 of the upper member 31, the bottom wall 37 of the lower member 36, and the intermediate portion of the left side member 10 is shown in FIG. 4. FIG. 4 mainly shows respective constituent elements of the left coupling member 30. However, respective constituent elements of a right coupling member 50 described later in detail have the configuration in which right and left of the left coupling member 30 are reversed, with the functions thereof being the same.

Because the right side part of the left coupling member 30 has less contribution to the strength and stiffness of the subframe 1, the gap 41 is provided to contribute weight saving of the left coupling member 30, and also weight saving of the subframe 1. Even if foreign matters such as water and sand enter from the gap 41, because the through-hole 42 is provided at a portion positioned on the lower part side of the vehicle of the bottom wall 37, foreign matters can be reliably discharged. Further, at the time of painting the subframe 1, the paint is caused to penetrate into the left coupling member 30 from the gap 41, thereby enabling to improve the throwing power of the paint.

<Configuration of Right Coupling Member>

The right side member 20 is provided with the right coupling member 50 having a box-shaped closed section, which is obtained typically by press-forming a flat plate member such as a steel plate. In terms of increasing the mounting stiffness to the vehicle body such as a rear side frame, it is preferable to provide the right coupling member 50 in the intermediate portion of the right side member 20 in the longitudinal direction.

The right coupling member 50 is configured by an upper member 51 welded, typically by arc welding or the like, to an upper outer periphery of the intermediate portion of the right side member 20 to form a vertical sectional shape, typically, in a substantially U-shape open downward, and a lower member 56 welded, typically by arc welding or the like, to a lower outer periphery of the intermediate portion of the right side member 20 to form a vertical sectional shape, typically, in a substantially U-shape open upward, facing the upper member 51 below thereof. The above configuration is preferable in terms of enabling that the outer periphery of the intermediate portion of the right side member 20 is enclosed and sandwiched by the upper member 51 and the lower member 56 and is welded thereto with a long weld length, to enhance the weld strength thereof.

The upper member 51 has a pair of flanges 53 and 54 suspended downward from opposite ends of an upper wall 52 of the upper member 51 in the longitudinal direction. The lower member 56 has a pair of flanges 58 and 59 extending upward from opposite ends of a bottom wall 57 of the lower member 56 in the longitudinal direction. The pair of flanges 53 and 54 of the upper member 51 and the pair of flanges 58 and 59 of the lower member 56 are correspondingly welded to each other typically by arc welding or the like, and the upper member 51 and the lower member 56 cooperate to form a box-shaped closed section.

The upper member 51 has a right through-hole 55 formed by punching so as to penetrate the right end of the upper wall 52 in the vertical direction, and the collar member 130 is arranged and fixed to the right through-hole 55. The lower member 56 has a right through-hole 60 formed by punching so as to penetrate the bottom wall 57 in the vertical direction, and facing the right through-hole 55 below thereof. The collar member 130 can be fitted between the right through-holes 55 and 60.

As in the left coupling member 30, a left side of the upper wall 52 of the upper member 51 and a left side of the bottom wall 57 of the lower member 56 are away from each other with a predetermined gap in the vertical direction to define a gap 61, which is away from the upper wall 52 of the upper member 51, the bottom wall 57 of the lower member 56, and the intermediate portion of the right side member 20. A through-hole 62 is provided at a bottommost part of the bottom wall 57 of the lower member 56.

<Configuration of Front Cross Member>

The front cross member 70 typically forms a box-shaped closed section having a matched portion at an appropriate position in walls correspondingly facing each other in the vertical direction and in the longitudinal direction. The front cross member 70 includes a left front-end through-hole 72 formed by punching so as to penetrate the left end of a front wall 71 in the longitudinal direction, and a right front-end through-hole 73 formed by punching so as to penetrate the right end of the front wall 71 in the longitudinal direction.

The front cross member 70 also includes a left rear-end through-hole 75 formed by punching so as to penetrate the left end of a rear wall 74 in the longitudinal direction, and facing the left front-end through-hole 72 in the front wall 71 at the rear thereof, and a right rear-end through-hole 76 formed by punching so as to penetrate the right end of the rear wall 74 in the longitudinal direction, and facing the right front-end through-hole 73 in the front wall 71 at the rear thereof. A nut member 140 is respectively arranged and fixed to the left rear-end through-hole 75 and the right rear-end through-hole 76.

It is preferable that a left end periphery of the front cross member 70 is notched so as to be depressed rightward, specifically, the front wall 71 is notched in a shape along a shape of an outer periphery of the left side member 10, and the rear wall 74 is notched in a shape along a shape of an external surface of the lower member 36 of the left coupling member 30.

In the notched portions, the front wall 71 abuts on the left side member 10, and the rear wall 74 abuts on the lower member 36 of the left coupling member 30. In this manner, the notched portions can be fixedly provided to the left side member 10 and the lower member 36 respectively by welding, typically by arc welding or the like, with a long weld length, thereby enabling to enhance the weld strength thereof.

It is preferable that a right end periphery of the front cross member 70 is notched so as to be depressed leftward, specifically, the front wall 71 is notched in a shape along a shape of an outer periphery of the right side member 20, and the rear wall 74 is notched in a shape along a shape of an external surface of the lower member 56 of the right coupling member 50, for the reason same as in the left end periphery of the front cross member 70.

The front cross member 70 can have a configuration in which the front cross member 70 is welded typically by arc welding or the like, in combination with a plurality of steel plate members.

<Configuration of Left Support Member and Right Support Member>

A left support member 110 and a right support member 120 are respectively welded, typically by arc welding or the like, to upper parts of right and left opposite ends of the front cross member 70, so as to be overlapped thereon correspondingly.

The left support member 110 has a vertical cross section in a U-shape open downward, which is obtained typically by press-forming a flat plate member such as a steel plate. The left support member 110 has a left front through-hole 112 formed by punching so as to penetrate a left end of a front wall 111 thereof in the longitudinal direction, and a left rear through-hole 114 facing the left front through-hole 112 at the rear thereof and formed by punching so as to penetrate a rear wall 113 thereof in the longitudinal direction. The nut member 140 is arranged and fixed to the left rear through-hole 114. It is preferable that the front wall 111 and the rear wall 113 of the left support member 110 correspondingly abut on and are welded to the front wall 71 and the rear wall 74 of the front cross member 70, in terms of increasing the weld length and enhancing the weld strength. Further, it is preferable that the front wall 111 and the rear wall 113 are extended toward a central portion of the front cross member 70 in a vehicle width direction, together with the upper wall continuous therebetween, in terms of increasing a vertical cross section and a horizontal cross section of the left support member 110 and enhancing the support stiffness of the suspension arm.

The right support member 120 has a configuration in which right and left of the left support member 110 are reversed, and has a vertical cross section in a U-shape open downward, which is obtained typically by press-forming a flat plate member such as a steel plate. The right support member 120 has a right front through-hole 122 formed by punching so as to penetrate a right end of a front wall 121 thereof in the longitudinal direction, and a right rear through-hole 124 facing the right front through-hole 122 at the rear thereof and formed by punching so as to penetrate a rear wall 123 thereof in the longitudinal direction. The nut member 140 is arranged and fixed to the right rear through-hole 124. It is preferable that the front wall 121 and the rear wall 123 of the right support member 120 correspondingly abut on and are welded to the front wall 71 and the rear wall 74 of the front cross member 70, in terms of increasing the weld length and enhancing the weld strength. Further, it is preferable that the front wall 121 and the rear wall 123 are extended toward the central portion of the front cross member 70 in the vehicle width direction, together with the upper wall continuous therebetween, in terms of increasing a vertical cross section and a horizontal cross section of the right support member 120 and enhancing the support stiffness of the suspension arm.

<Configuration of Rear Cross Member>

The rear cross member 80 typically has a vertical cross section in a hat-like shape open downward and includes a left front through-hole 83 formed by punching so as to penetrate a left end of a front wall 82 in a central portion 81 thereof in the longitudinal direction, and a right front through-hole 84 formed by punching so as to penetrate a right end of the front wall 82 in the central portion 81 thereof in the longitudinal direction.

The rear cross member 80 includes a left rear-middle through-hole 86 formed by punching so as to penetrate a left end of a rear wall 85 in the central portion 81 thereof in the longitudinal direction and facing the left front through-hole 83 in the front wall 82 at the rear thereof, and a right rear-middle through-hole 87 formed by punching so as to penetrate a right end of the rear wall 85 in the central portion 81 thereof in the longitudinal direction, and facing the right front through-hole 84 in the front wall 82 at the rear thereof. A guide member 150 is arranged and fixed, respectively, to the left rear-middle through-hole 86 and the right rear-middle through-hole 87.

It is preferable that the rear cross member 80 has a left end portion 90 having a larger width in the longitudinal direction than that of the central portion 81, in a plan view and a connection portion 91 that connects the left end portion 90 and the central portion 81, in terms of efficiently enhancing the strength thereof, while suppressing an increase in weight thereof.

It is preferable that the left end portion 90 extends onto the upper wall 32 of the left coupling member 30 and the left side member 10, and is fixedly provided by being welded thereto typically by arc welding or the like, in terms of enhancing the weld strength thereof.

Specifically, in the left end portion 90, it is preferable that a part extending onto the upper wall 32 of the left coupling member 30 is a left end portion of a front flange 88 extending in the right and left direction, while protruding forward from a lower end of the front wall 82, taking forming workability of the rear cross member 80 into consideration. In the left end portion 90, it is also preferable that a part extending onto the left side member 10 is the upper wall of the rear cross member 80 in terms of the layout thereof. However, it is preferable that the part extending onto the left side member 10 is bifurcated via a notched portion C, taking weight saving of the rear cross member 80 into consideration. It is further preferable that a left end periphery of the rear wall 85 is notched so as to be depressed rightward and the notched portion is welded, typically by arc welding or the like, to the left side member 10, in terms of enhancing the weld strength. Further, it is preferable that extended portions of a left end of the rear wall 85 and a left end of a rear flange 89 extending in the right and left direction, while protruding rearward from the lower end of the rear wall 85, round under the left side member 10, and the left end of the rear wall 85 is welded to the left side member 10, typically by arc welding or the like, in terms of enhancing the weld strength thereof and the weld strength to the left side member 10 by putting the left side member 10 between the upper wall extending onto the left side member 10 and the left end of the rear wall 85.

It is preferable that the rear cross member 80 has a right end portion 92 having a larger width in the longitudinal direction than that of the central portion 81, in a plan view, and a connection portion 93 that connects the right end portion 92 and the central portion 81, in terms of efficiently enhancing the strength thereof, while suppressing an increase in weight thereof.

It is preferable that the right end portion 92 extends onto the upper wall 52 of the right coupling member 50 and the right side member 20, and is fixedly provided by being welded thereto typically by arc welding or the like, in terms of enhancing the weld strength thereof. The circumstances are the same with regard to the configuration of the left end portion 90, in addition to the detailed configurations thereof.

Specifically, in the central portion 81 of the rear cross member 80, it is preferable that a reinforcing member 100 connects the front flange 88 protruding forward from the lower end of the front wall 82 and extending in the right and left direction with the rear flange 89 extending rearward from the lower end of the rear wall 85 and is fixedly provided by being welded typically by arc welding or the like, in terms of enhancing the strength thereof.

The rear cross member 80 can be configured by combining a plurality of steel plate members or the like and welding typically by arc welding or the like.

With respect to the upper wall 32 of the left coupling member 30, a lower end of the rear wall 113 of the left support member 110 is welded to a front end thereof and the left end 90 of the rear cross member 80 is welded to a rear end thereof. The respective welded portions are preferably arranged away from each other in the longitudinal direction. The circumstances are the same with regard to the upper wall 52 of the right coupling member 50.

This is because welding of the rear cross member 80 and the left support member 110 can be performed in the same process at the time of production of the subframe 1, by arranging the respective welded portions away from each other in the longitudinal direction, and the number of production processes and the production cost of the subframe 1 can be reduced.

Furthermore, it is preferable that a left lower end of the rear wall 113 of the left support member 110 welded to the front end of the upper wall 32 of the left coupling member 30 becomes a flange-like flat plate portion F by being bent rearward, in terms of increasing the welded area and enhancing the weld strength by welding or the like. The circumstances are the same with regard to the right support member 120 welded to the front end of the upper wall 52 of the right coupling member 50.

In the configuration described above, the subframe 1 includes a first opening, a second opening, a third opening, a fourth opening, a fifth opening, and a sixth opening, being portions in which insides of respective components constituting the subframe 1 are open to outside. Specifically, the first opening is a portion between the left front-end through-hole 72 and the left rear-end through-hole 75 of the front cross member 70, with the inside thereof being open to outside. The second opening is a portion between the right front-end through-hole 73 and the right rear-end through-hole 76 of the front cross member 70, with the inside thereof being open to outside. The third opening is a portion between the left front through-hole 83 and the left rear-middle through-hole 86 of the rear cross member 80, with the inside thereof being open to outside. The fourth opening is a portion between the right front through-hole 84 and the right rear-middle through-hole 87 of the rear cross member 80, with the inside thereof being open to outside. The fifth opening is a portion between the left front through-hole 112 and the left rear through-hole 114 of the left support member 110, with the inside thereof being open to outside. The sixth opening is a portion between the right front through-hole 122 and the right rear through-hole 124 of the right support member 120, with the inside thereof being open to outside.

In this case, the first opening, the second opening, the third opening, the fourth opening, the fifth opening, and the sixth opening are respectively set correspondingly to a first support portion S1, a second support portion S2, a third support portion 53, a fourth support portion 54, a fifth support portion 55, and a sixth support portion S6, respectively.

More specifically, the first support portion S1 is arranged correspondingly to the first opening defined between the left front-end through-hole 72 and the left rear-end through-hole 75 of the front cross member 70. In the first support portion S1, a right pivot of a suspension arm (both not shown) is fastened by a fastening member such as a fastening bolt and mounted via the left front-end through-hole 72, the left rear-end through-hole 75, and the nut member 140 provided in the front cross member 70.

The second support portion S2 is arranged correspondingly to the second opening defined between the right front-end through-hole 73 and the right rear-end through-hole 76 of the front cross member 70. In the second support portion S2, a left pivot of a suspension arm (both not shown) is fastened by a fastening member such as a fastening bolt and mounted via the right front-end through-hole 73, the right rear-end through-hole 76, and the nut member 140 provided in the front cross member 70.

The third support portion S3 is arranged correspondingly to the left front through-hole 83 and the left rear-middle through-hole 86 fixedly provided with the guide member 150 of the rear cross member 80. In the third support portion S3, the right pivot of the suspension arm (both not shown) is fastened by a fastening member such as a fastening bolt and mounted via the left front through-hole 83, the left rear-middle through-hole 86, and the guide members 150.

The fourth support portion S4 is arranged correspondingly to the right front through-hole 84 and the right rear-middle through-hole 87 fixedly provided with the guide member 150 of the rear cross member 80. In the fourth support portion S4, the left pivot of the suspension arm (both not shown) is fastened by a fastening member such as a fastening bolt and mounted via the right front through-hole 84, the right rear-middle through-hole 87, and the guide members 150.

The fifth support portion S5 is arranged correspondingly to the left front through-hole 112 and the left rear through-hole 114 fixedly provided with the nut member 140 of the left support member 110. In the fifth support portion S5, the right pivot of the suspension arm (both not shown) is fastened by a fastening member such as a fastening bolt and mounted via the left front through-hole 112, the left rear through-hole 114, and the nut member 140.

The sixth support portion S6 is arranged correspondingly to the right front through-hole 122 and the right rear through-hole 124 fixedly provided with the nut member 140 of the right support member 120. In the sixth support portion S6, the left pivot of the suspension arm (both not shown) is fastened by a fastening member such as a fastening bolt and mounted via the right front through-hole 122, the right rear through-hole 124, and the nut member 140.

The right and left pivots described above are suspension pivots positioned correspondingly to the right and left pivots (not shown) and facing the inside of the right and left pivots in the width direction. The right and left pivots define positions of right and left rear wheels (not shown) in the longitudinal direction and in the width direction correspondingly, and apply a relatively large external force to the subframe mainly in the width direction. As a typical configuration of the right and left pivots, an insulator bush member having a configuration in which a rubber portion is welded to a collar member into which a fastening member thereof is inserted, and having a small spring constant in the longitudinal direction and a large spring constant in the width direction can be mentioned. A spring reaction force of a suspension spring (not shown) can be applied to a predetermined pair of right and left pivots described above.

In addition, a first attachment portion A1, a second attachment portion A2, a third attachment portion A3, a fourth attachment portion A4, a fifth attachment portion A5, and a sixth attachment portion A6 are set correspondingly.

More specifically, the first attachment portion A1 is arranged correspondingly to the left crushed portion 11 of the left side member 10. In the first attachment portion A1, the left crushed portion 11 is fastened to the left rear side frame by a fastening member such as a fastening bolt (both not shown) via the upper and lower flat surface portions provided thereto and the mounting hole 12, and mounted on the vehicle body side.

The second attachment portion A2 is arranged correspondingly to the left rectangular formed portion 13 of the left side member 10. In the second attachment portion A2, the left rectangular formed portion 13 is fastened to the left rear side frame by a fastening member such as a fastening bolt (both not shown) via the collar member 130 provided thereto and the left rear through-holes 14 and 15, and mounted on the vehicle body side.

The third attachment portion A3 is arranged correspondingly to the left coupling member 30 provided in the central portion of the left side member 10. In the third attachment portion A3, the left coupling member 30 is fastened to the left rear side frame by a fastening member such as a fastening bolt (both not shown) via the collar member 130 provided thereto and the left through-holes 35 and 40, and mounted on the vehicle body side.

The fourth attachment portion A4 is arranged correspondingly to the right crushed portion 21 of the right side member 20. In the fourth attachment portion A4, the right crushed portion 21 is fastened to the right rear side frame by a fastening member such as a fastening bolt (both not shown) via the upper and lower flat surface portions provided thereto and the mounting hole 22, and mounted on the vehicle body side.

The fifth attachment portion A5 is arranged correspondingly to the right rectangular formed portion 23 of the right side member 20. In the fifth attachment portion A5, the right rectangular formed portion 23 is fastened to the right rear side frame by a fastening member such as a fastening bolt (both not shown) via the collar member 130 provided thereto and the right rear through-holes 24 and 25, and mounted on the vehicle body side.

The sixth attachment portion A6 is arranged correspondingly to the right coupling member 50 provided in the central portion of the right side member 20. In the sixth attachment portion A6, the right coupling member 50 is fastened to the right rear side frame by a fastening member such as a fastening bolt (both not shown) via the collar member 130 provided thereto and the right through-holes 55 and 60, and mounted on the vehicle body side.

The various nut members, collar members, and guide members described above are typically made of metal such as a steel material.

In the present invention including various modifications described above, the suspension arm can be a suspension arm other than the suspension arm of the present embodiment, so long as it has the same function as that of the suspension arm of the present embodiment.

In the present invention including various modifications described above, the subframe 1 can be mounted on a vehicle body in a so-called "floating format", not in a so-called "rigid format".

In the present invention, the types, the shapes, the arrangements, the numbers, and the like of constituent elements are not limited to those described in the above embodiments, and it is needless to mention that changes can be appropriately made without departing from the scope of the invention, such as replacing these constituent elements with other elements having equivalent operational effects.

INDUSTRIAL APPLICABILITY

As described above, in the present invention, a support portion of a suspension arm can be configured with a simple configuration, while ensuring required productivity corresponding to various types of vehicles, and a vehicle subframe that can improve the support stiffness of the suspension arm can be provided. Therefore, because of its general purposes and universal characteristics, applications of the present invention can be expected in a wide range in the field of a subframe of a vehicle body of a movable body such as a vehicle.

The invention claimed is:
1. A vehicle subframe comprising:
a pair of side members respectively extending in a longitudinal direction of a vehicle, while facing each other in a width direction of the vehicle, and respectively having a plurality of coupling portions provided for coupling with a vehicle body member of the vehicle;

a pair of coupling members respectively provided in each of the pair of side members to couple a corresponding one of the plurality of coupling portions with the vehicle body member;

a pair of cross members respectively extending in the width direction, while facing each other in the longitudinal direction, to couple the pair of side members with each other respectively; and a pair of support members respectively provided in one of the pair of cross members, to support correspondingly a pair of suspension arms provided in the vehicle, facing each other in the width direction, wherein a lower part of the pair of support members is welded respectively to upper walls of the pair of coupling members and vertical walls of the one of the cross members, straddling the upper walls and the vertical walls, wherein in each of the pair of side members, the coupling portions respectively include a front coupling portion provided on a front side of the vehicle, a rear coupling portion provided on a rear side of the vehicle with respect to the front coupling portion, and an intermediate coupling portion provided between the front coupling portion and the rear coupling portion in the longitudinal direction, and each of the pair of coupling members is provided correspondingly to the intermediate coupling portion, wherein each of the pair of coupling members has an upper member open downward of the vehicle and a lower member open upward of the vehicle, and the upper member and the lower member corresponding thereto sandwich a corresponding one of the pair of side members and are welded thereto, and wherein a gap portion is provided inside thereof in the width direction, between the upper wall of the upper member of a corresponding one of the pair of coupling members and a bottom wall of the lower member of the corresponding one of the pair of coupling members.

2. The subframe according to claim 1, wherein a through-hole is provided in the bottom wall of each of the lower members of the pair of coupling members.

3. The vehicle subframe according to claim 1, wherein each of the upper members of the pair of coupling members is respectively welded to the other one of the pair of cross members, and in each of the pair of coupling members, a welded portion between the upper member and the pair of support members and a welded portion between the upper member and the other cross member are arranged away from each other in the longitudinal direction.

4. The vehicle subframe according to claim 3, wherein the other cross member includes a central portion in the width direction, a pair of end portions having a larger width in the longitudinal direction than a width of the central portion in the longitudinal direction, and a pair of connection portions that connect the central portion and the pair of end portions respectively correspondingly, and in each of the pair of side members, each of the upper members of the pair of coupling members is welded correspondingly to the pair of end portions of the other cross member.

5. The vehicle subframe according to claim 1, wherein the pair of side members is formed of a tubular member, respectively, in each of the pair of side members, the front coupling portion of the plurality of coupling portions respectively has a crushed portion in which the tubular member is crushed in a vertical direction of the vehicle, and the crushed portion respectively has a mounting surface with respect to the vehicle body member.

6. A vehicle subframe comprising:

a pair of side members respectively extending in a longitudinal direction of a vehicle, while facing each other in a width direction of the vehicle, and respectively having a plurality of coupling portions provided for coupling with a vehicle body member of the vehicle;

a pair of coupling members respectively provided in each of the pair of side members to couple a corresponding one of the plurality of coupling portions with the vehicle body member;

a pair of cross members respectively extending in the width direction, while facing each other in the longitudinal direction, to couple the pair of side members with each other respectively; and a pair of support members respectively provided in one of the pair of cross members, to support correspondingly a pair of suspension arms provided in the vehicle, facing each other in the width direction, wherein a lower part of the pair of support members is welded respectively to upper walls of the pair of coupling members and vertical walls of the one of the cross members, straddling the upper walls and the vertical walls, wherein in each of the pair of side members, the coupling portions respectively include a front coupling portion provided on a front side of the vehicle, a rear coupling portion provided on a rear side of the vehicle with respect to the front coupling portion, and an intermediate coupling portion provided between the front coupling portion and the rear coupling portion in the longitudinal direction, and each of the pair of coupling members is provided correspondingly to the intermediate coupling portion, wherein each of the pair of coupling members has an upper member open downward of the vehicle and a lower member open upward of the vehicle, and the upper member and the lower member corresponding thereto sandwich a corresponding one of the pair of side members and are welded thereto, and wherein each of the upper members of the pair of coupling members is respectively welded to the other one of the pair of cross members, and in each of the pair of coupling members, a welded portion between the upper member and the pair of support members and a welded portion between the upper member and the other cross member are arranged away from each other in the longitudinal direction.

7. The vehicle subframe according to claim 6, wherein the other cross member includes a central portion in the width direction, a pair of end portions having a larger width in the longitudinal direction than a width of the central portion in the longitudinal direction, and a pair of connection portions that connect the central portion and the pair of end portions respectively correspondingly, and in each of the pair of side members, each of the upper members of the pair of coupling members is welded correspondingly to the pair of end portions of the other cross member.

8. The vehicle subframe according to claim 6, wherein the pair of side members is formed of a tubular member, respectively, in each of the pair of side members, the front coupling portion of the plurality of coupling portions respectively has a crushed portion in which the tubular member is crushed in a vertical direction of the vehicle, and the crushed portion respectively has a mounting surface with respect to the vehicle body member.

* * * * *